United States Patent
Denes et al.

(10) Patent No.: US 9,566,735 B2
(45) Date of Patent: Feb. 14, 2017

(54) METHOD FOR REGULATING AN INJECTION MOLDING PROCESS

(75) Inventors: Istvan Denes, Waiblinge/Hohenacker (DE); Paeivi Lehtonen-Brenner, Fellbach (DE); Robert Wieland, Sulzbach (DE); Stephan Geise, Ruethen (DE); Guenter Haag, Stuttgart (DE); Philipp Liedl, Stuttgart (DE); Patricia Maris-Haug, Pleidelsheim (DE); Jens Ackermann, Stuttgart (DE); Holger Nalop, Ludwigsburg (DE); Stephan Althaus, Drei Gleichen Ot Cobstaedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 648 days.

(21) Appl. No.: 13/580,298

(22) PCT Filed: Jan. 4, 2011

(86) PCT No.: PCT/EP2011/050052
§ 371 (c)(1),
(2), (4) Date: Nov. 12, 2012

(87) PCT Pub. No.: WO2011/101177
PCT Pub. Date: Aug. 25, 2011

(65) Prior Publication Data
US 2013/0270728 A1  Oct. 17, 2013

(30) Foreign Application Priority Data
Feb. 22, 2010 (DE) .................. 10 2010 002 174

(51) Int. Cl.
*B29C 45/76* (2006.01)
*G05B 19/418* (2006.01)

(52) U.S. Cl.
CPC ....... *B29C 45/762* (2013.01); *G05B 19/41875* (2013.01); *G05B 2219/32182* (2013.01);
(Continued)

(58) Field of Classification Search
CPC ................. B29C 45/762; G05B 2219/45244
See application file for complete search history.

(56) References Cited

U.S. PATENT DOCUMENTS 5,229,952 A * 7/1993 Galloway et al. ........... 700/200
5,246,644 A   9/1993 Wenskus et al.
(Continued)

FOREIGN PATENT DOCUMENTS

CN   1479670      3/2004
DE   44 34 654    4/1996
(Continued)

OTHER PUBLICATIONS

Electronic translation of DE 4434653.*

*Primary Examiner* — Jill Heitbrink
(74) *Attorney, Agent, or Firm* — Norton Rose Fulbright US LLP; Gerard Messina

(57) ABSTRACT

A method for regulating an injection molding process in which process setting variables of an injection molding machine are controlled via a regulating module, which receives data from a process-internal sensor system of the injection molding machine, data on the fabricating sequence of the injection molding component parts from an external sensor system and/or data on the quality of a fabricated injection molded component part from an online component part control, evaluates these data in a quality prognosis module and, as a function of the data evaluation, performs a change in the process setting variables of the injection molding machine, because of the change in the process setting values, the working point of the injection molding
(Continued)

machine being changed so that the quality features of the injection molded component parts fabricated using the changed working point lie within the specified tolerances of the quality of the injection molded component parts.

18 Claims, 10 Drawing Sheets

(52) U.S. Cl.
CPC .............. *G05B 2219/32188* (2013.01); *G05B 2219/32194* (2013.01); *G05B 2219/45244* (2013.01); *Y02P 90/22* (2015.11)

(56) References Cited

U.S. PATENT DOCUMENTS

| | | | | |
|---|---|---|---|---|
| 5,518,671 | A | * | 5/1996 | Takizawa et al. ........... 264/40.1 |
| 5,945,046 | A | * | 8/1999 | Hehl et al. ................... 264/40.1 |
| 7,507,359 | B2 | | 3/2009 | Werfeli |
| 2008/0039969 | A1 | * | 2/2008 | Liu et al. ...................... 700/197 |

FOREIGN PATENT DOCUMENTS

| | | | |
|---|---|---|---|
| DE | 4434653 | * | 4/1996 |
| DE | 197 15 630 | | 10/1998 |
| DE | 197 43 600 | | 4/1999 |
| DE | 198 34 797 | | 2/2000 |
| DE | 101 20 476 | | 11/2002 |
| DE | 102 41 746 | | 3/2004 |
| JP | 05-96592 | * | 4/1993 |
| WO | 93/04839 | | 3/1993 |
| WO | 2006/124635 | | 11/2006 |

* cited by examiner

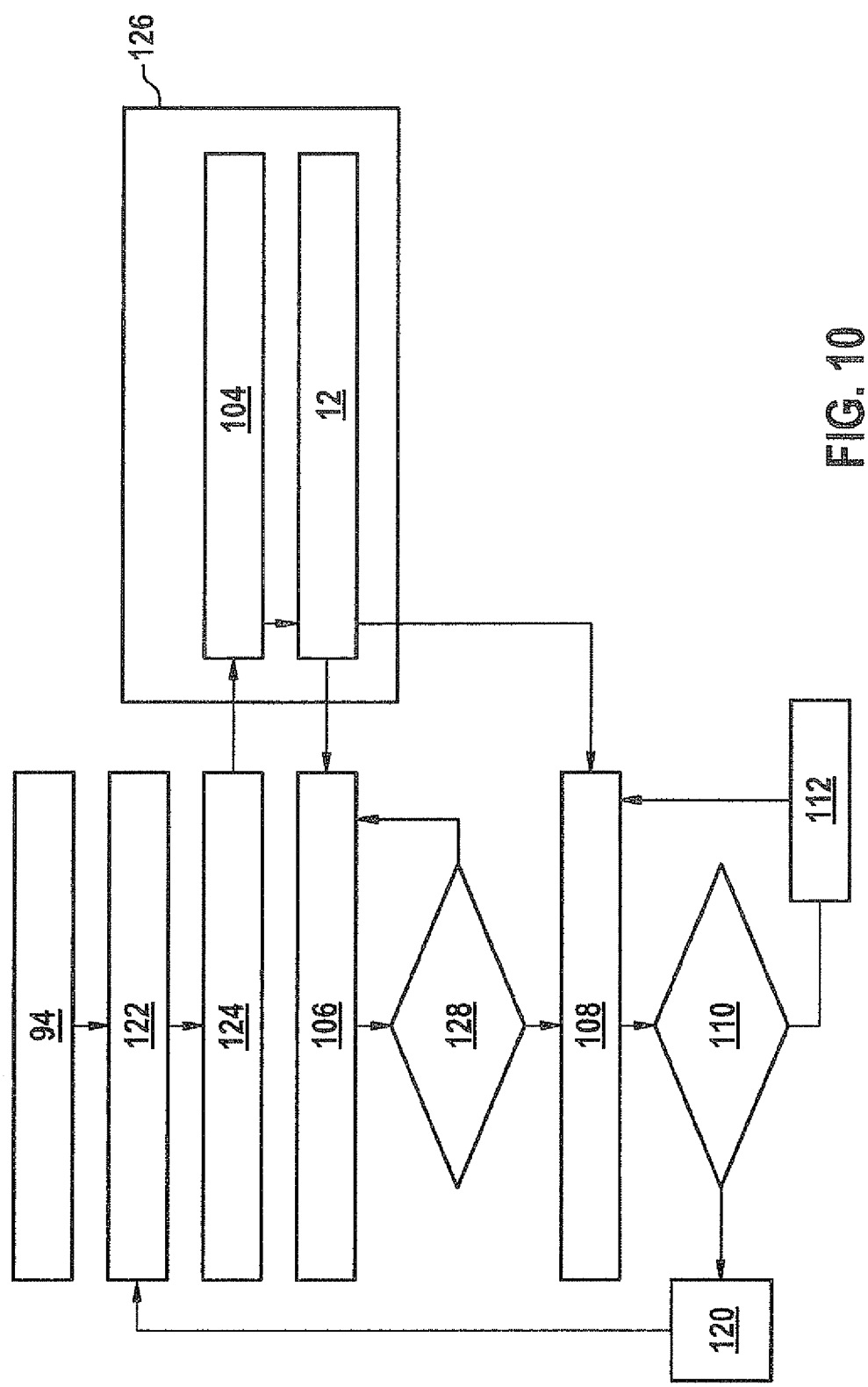

METHOD FOR REGULATING AN INJECTION MOLDING PROCESS

FIELD OF THE INVENTION

The present invention relates to a method for regulating an injection molding process.

BACKGROUND INFORMATION

The injection molding process is an established method for the primary forming of plastic component parts in industry. It is frequently used in larger productions. So far, fundamental, quality-monitoring measures have been integrated into injection molding machines. Because of changes in the process and because of external influences on these, however, even using the same machine parameters and process parameters, component parts may be produced that have different qualities. Up to now, preponderantly only changes in the process signals have been recognized when, for example, a previously defined envelope or tolerance for process characteristic variables are exceeded or undershot. In this case, the corresponding component parts are rejected via a quality gate. This functionality is integrated into most of the current injection molding machines. This process valuation is relatively inaccurate, however, since the quality features are not directly valued, and it does not enable regulation of the process. An adjustment of the machine parameters requires the intervention of an operator, and as a rule, takes place only after scrap has already been produced. The adjustment of the injection molding parameters takes place according to the experience of the operator, since the quality factors of the component part, depending on the component part, act differently on individual machine parameters.

German document DE 101 204 76 A1 discusses a hybrid model and a method for determining the properties with respect to fabricating an injection molded part which is made up of one or more neural network and having rigorous models which are interconnected. The rigorous models are used for imaging submodels that are operable using mathematical formulas. The neural submodel is used for imaging processes whose connection is present only in the form of data, and which are not able to be modeled rigorously. By the combination of the methods, the prognosis of process times and processing properties during the injection molding of plastic molded parts is supposed to be clearly improved. The method described supplies prognoses based on characteristic features of the process and of the material to be processed to form thermal and rheological processing properties and for the cycle time. However, no regulation takes place, in DE 101 204 76 A1, of the process with respect to quality features of the fabricated injection molded parts.

In DE 102 417 46 A1, a method is discussed for quality valuation and process monitoring in cyclical production processes, a distinction being made between a setting phase I, a setting phase II and a working phase, and a quality valuation taking place of the products fabricated in the cyclical production process with the aid of a set of quality features, an automatic working point optimization, a generation of a first training data set, an automatic selection of characteristic variables and a self-generating process model going into the first setting phase, which is taken over into the working phase. Besides the process model, the latter includes a quality valuation module and a process monitoring module and, at inadmissible deviations, provides for random sampling in a setting phase II, which leads to generating an additional training data set, having subsequent renewed characteristic variable selection and adjustment of the self-generating process model, which is thereafter taken over into the working phase. The quality valuation and the process monitoring take place, in this instance, in separate phases or cycles, that are required in addition to the actual injection molding process, whereby the overall method sequence takes very much time and is very costly.

SUMMARY OF THE INVENTION

It is therefore an object of the exemplary embodiments and/or exemplary methods of the present invention to provide a method for regulating an injection molding process, by which current quality monitoring is made possible and, at the same time, the number of injection molded component parts regarded as scrap is able to be reduced as much as possible.

This object may be attained according to the exemplary embodiments and/or exemplary methods of the present invention by the features described herein. Advantageous embodiments of the present invention are also described herein.

The method according to the present invention for regulating an injection molding process takes place in that process setting variables of an injection molding machine are controlled via a regulating module, the regulating module receiving data from a process-internal sensor system of the injection molding machine, data on the fabricating sequence of the injection molding component parts from an external sensor system and/or data on the quality of a fabricated injection molded component part from an online component part control, evaluates these data in a quality prognosis module and, as a function of the evaluation of the data, carries out a change in the process setting variables of the injection molding machine, because of the change in the process setting values, the working point of the injection molding machine being changed in such a way that the quality features of the injection molded component parts fabricated using the changed working point lie within the specified tolerances of the quality of the injection molded component parts.

Using the method according to the present invention, it is possible, from the changes in the quality features obtained via the prognosis model in real time, to change the working point of the injection molding machine with the aid of calculated changes in the process setting variables and in the machine setting variables in such a way that the quality features of the component parts fabricated using the changed working point lie within the specified tolerances. A working point is composed of a plurality of setting parameters or machine setting parameters of the injection molding machine, the actual working point of the injection molding machine corresponding to the real actual setting parameters of the injection molding machine. Because of the change in the process setting variables, that is, the setting parameter of the injection molding machine, the working point of the injection molding machine may be changed continuously during the injection molding process, so that at all times an optimal quality of the fabricated injection molding component parts is able to be achieved.

In this context, it is possible to change, and optimally set the working point as a function of the smallest deviation of the setting parameter, so that these unevennesses may be compensated as directly as possible. In the process, the setting parameters and the process setting variables of the injection molding machine may be changed in a hierarchical sequence, so that the setting parameters and the process setting variables, that are more time-critical from the point of view of the reaction time of the injection molding machine, such as the temperatures, are not changed, or changed only very slowly, so that the number of component parts ascertained as being scrap between two successive working point settings is as small as possible. It is thereby possible to raise the productivity of the injection molding machine and, at the same time, to lower the energy and recycling costs. During the fabricating process, if unexpected external influences occur, which interfere with the process, and which until currently were not able to be readjusted, according to the present invention, these are detected with the aid of prognosticated quality features, and a corresponding output signal is output. This may take place, for example, by monitoring the scrap rate averaged over a plurality of fabricating cycles and/or by using the sensor values specific to the monitoring.

In this instance, the process regulation is able to adjust automatically to the complexity of the physical processes on which it is based. The method is designed in such a way that no specific knowledge is required, of a user, of statistical mathematical methods, particularly of neural networks, In addition, the quality valuing of the relevant process characteristic variables may be formed in an automated way for each individual quality feature. The process characteristic variables that were also selected in an automated manner, and the dependencies ascertained for each quality feature contribute to increasing process comprehension. Slow process drifts, perhaps as a result of increasing room temperature or as a result of batch changes, may be recognized and detected, and compensated for within specifiable boundary values by the regulation, so that, if possible, no scrap component parts are produced. The use of the process regulation, using the regulating module according to the present invention, additionally makes possible an online prediction of component part measures and any other features desired, such as bur formation, form filling, heating stains, etc., for each fabricated component part. Information on the running process may be gathered from the measuring prognoses.

With that, a direct quality assessment is possible. The process is regulated with the aid of the prognoses, by transmitting a new working point to the system. This is calculated with the aid of a second neural network, which links the machine setting parameters and the process setting variables, such as the magnitude of the downstream pressure, the injection speed, etc., to the measured values and the quality features of the component parts. In this manner, a regulation may be made possible that overlaps the cycles.

According to one advantageous embodiment of the present invention, process characteristic variables are ascertained within the regulating module, from the data of the external sensor system and from the data of the internal process sensor system, from the process characteristic variables and the data of the online component parts control a quality prognosis being carried out for at least one quality feature of an injection molded component part. It may be possible that, for each individual quality feature of an injection molded component part, a quality prognosis may be carried out.

The process characteristic variables are transferred to a quality prognosis module within the regulating module, in this instance, which, from process-conditioned changes of the process characteristic variables, carries out online a quality prognosis for at least one, which may be for each quality feature of the injection molded component part. By doing this, component parts, whose prognosticated quality features are outside the respective tolerance range, may be rejected immediately. Because of this, a certain and continuous quality control of the fabricated injection molded component parts becomes possible even during the fabricating process.

According to an additional advantageous embodiment of the present invention, the regulating module detects sensor faults occurring during the injection molding process, and corrects these online. In this context, particularly the sensor faults of the external sensor system and the internal process sensor system are detected. Because of this, sensor faults occurring during the fabricating process, for instance, in the case of a pressure sensor having a pressure offset in the course of the fabricating time, may be detected and, if necessary, corrected directly during the fabricating process. If a sensor fault is detected which cannot be corrected, a corresponding message is output. Because sensor faults are able to be detected, misassessments of the quality features may be prevented, which could otherwise make erroneous all the process characteristic variables derived from one signal.

Thereby, a particularly secure process monitoring and regulation of the injection molding process is possible. In particular, an especially secure quality control of the fabricated component parts is thereby possible. The online correction may take place in that, by an online readjustment of the external sensor system and the internal process sensor system, the sensor values are able to be corrected, so that, in addition and without the interruption of the process, a reliable online prognosis of the quality features is able to take place. Online means, in this case, that the prognosis of the quality features takes place automatically and currently, during the running fabricating process, without the user having to control it or having to let the injection molding machine run additional setting cycles and quality prognosis cycles.

In order to be able to remove the injection molding component parts, detected to be scrap in the quality prognosis, directly from the fabricating process, it may be provided that a scrap gate be actuated directly via the quality prognosis module.

Furthermore, it may be provided that the process stability be ascertained inside the regulating module, using the process characteristic variables ascertained from the data of the external sensor system and from the data of the internal process sensor system and, in case the process stability exceeds specified boundary values, a message is output. The valuation of the process stability may take place using the process characteristic variables and their course over time as input variables. Only when the fabricating process is valued as being sufficiently stable is fabrication able to take place under reproducible fabricating conditions, and the requirement of a change in the working point is able to be detected in a reliable manner.

Furthermore, it may be provided that the regulating module include a process setting module within which an existing working point of the injection molding process, based on the quality prognosis, a process drift detection and the process stability is ascertained and valued, and if necessary, a new changed working point is established. It is thereby possible appropriately to change the fabricating process and the injection molding process directly to changes in the ascertained quality prognosis of the process drift detection, or in the case of a change in the process stability, by establishing a new working point, so that the quality of the fabricated injection molding component parts is able to continue to be maintained, and no loss of quality takes place, Thereby one is able to pay attention to any interference factors whatsoever during the fabricating process, so that one is able to act directly on the fabricating process, so as to avoid letting quality losses occur in the fabricated injection molded component parts.

In this context, there may take place a step-wise adaptation of the existing working point to the newly changed working point. Because of the timely step-wise adaptation of the existing working point to the new working point, it is possible to prevent injection molding component parts, that are to be declared to be scrap, from being fabricated, so that all the quality features of the additionally fabricated component parts are within the tolerance specifications for the quality of the component parts.

The advantages named above of the method for regulating an injection molding process also apply correspondingly to a regulating module having an arrangement for carrying out this method.

In the following text, the exemplary embodiments and/or exemplary methods of the present invention are explained in greater detail with reference to the appended drawings, with the aid of exemplary embodiments.

BRIEF DESCRIPTION OF THE DRAWINGS

FIG. 10 shows a block diagram of an automated DoE execution module.

DETAILED DESCRIPTION

Figure 1:
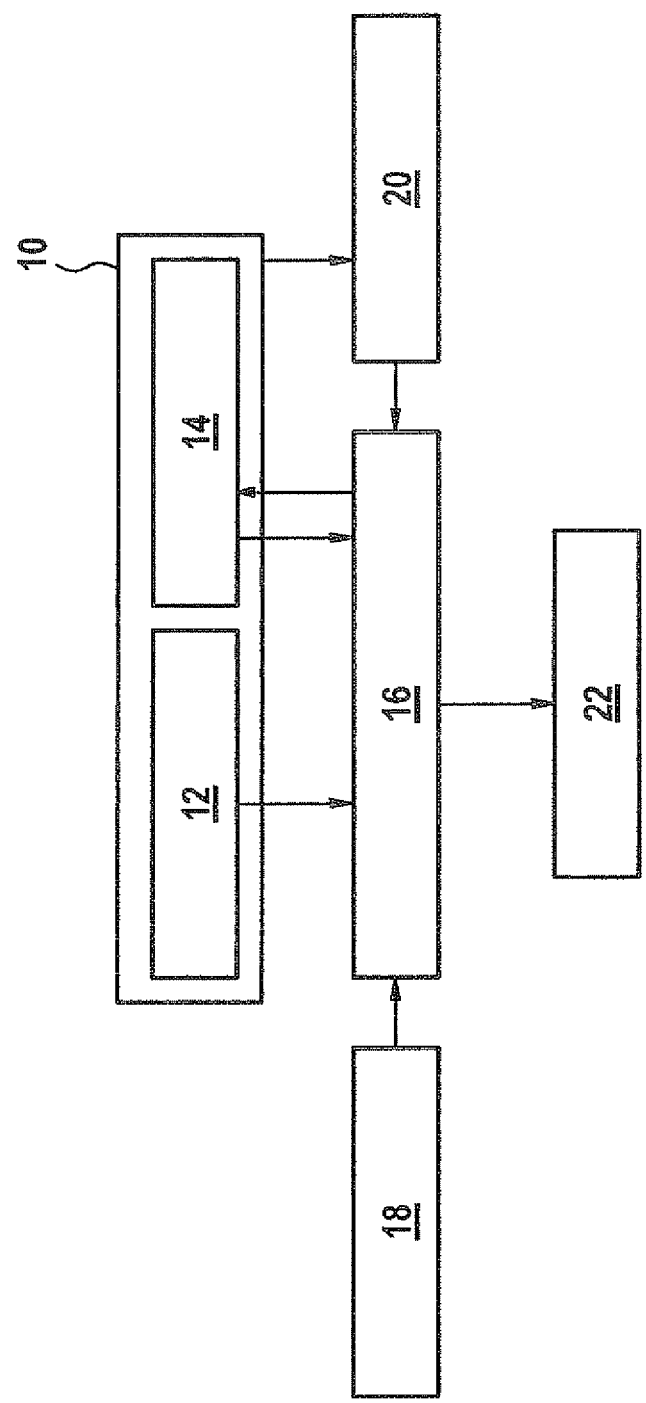
FIG. 1 shows a block diagram of an overall system according to the present invention.

FIG. 1 shows a block diagram of an overall system of a method according to the present invention. In it, 10 denotes an injection molding machine which is equipped with an internal process sensor system 12. The working point of injection molding machine 10 may be changed via process setting variables 14. Injection molding machine 10 is connected to a regulating module 16, so that information and data are able to be transmitted between injection molding machine 10 and regulating module 16.

In addition, an external sensor system 18 is present, which passes signals from the fabricating course, or rather, the injection molding course to regulating module 16 for valuation. In accordance with the exemplary embodiments and/or exemplary methods of the present invention, an online component part control 20 is provided, so that additional information on the quality of each fabricated injection molding component part may be passed on to regulating module 16 for valuation. If necessary, regulating module 16 changes the process setting variables 14 of the injection molding machine. The actuation of a scrap gate 22 also takes place via regulating module 16.

Figure 2:
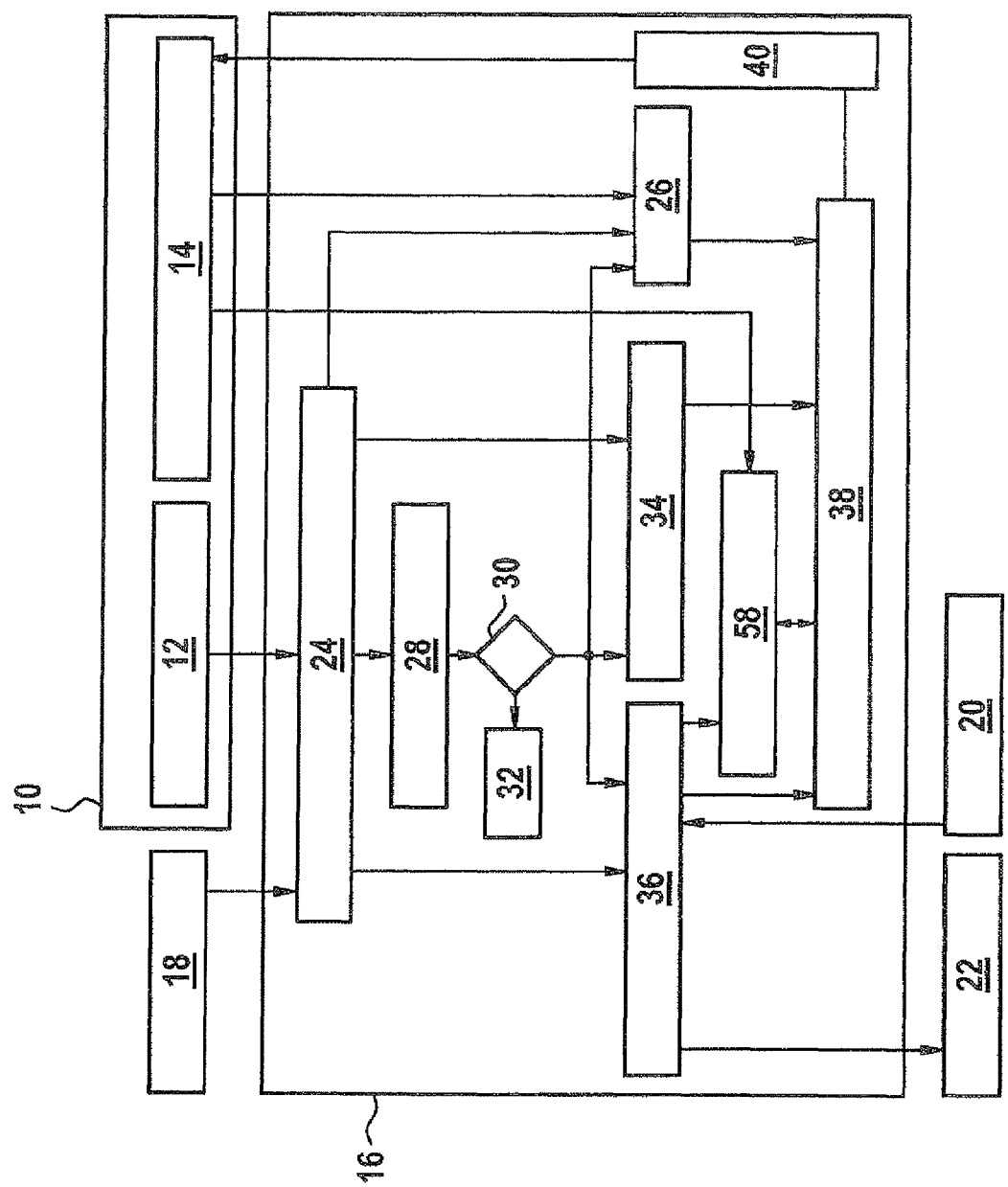
FIG. 2 shows a block diagram of a regulating module.

FIG. 2 shows a block diagram of a regulating module 16 according to the present invention. Sensor data of injection molding machine 10 and/or of tools connected to injection molding machine 10, such as the inner tool pressure and/or temperature values are transmitted via internal process sensor system 12 to a process characteristic variables module 24. Within process characteristic variables module 24, a set of process characteristic variables is formed using different statistical methods, which are correlated with one another as little as possible, from the received sensor data of external sensor system 18 and internal process sensor system 12, which may be present as discrete values or as a continuous data flow. Examples of process characteristic variables are, for instance, a maximum value of a signal, the increase of a signal at a certain point in time, an individual signal value or different time windows, such as the downstream pressure time.

The process characteristic variables are monitored in a process drift detection module 26 with respect to slow process drifts, and used in a sensor monitoring module 28, for the analysis of possible sensor faults. Because of sensor monitoring module 28 it may be made certain, according to the exemplary embodiments and/or exemplary methods of the present invention, that sensor faults occurring during the injection molding process, for instance, in case a pressure sensor has a pressure offset during the course of the fabricating time, this sensor fault is detected and, if possible, is corrected by an online readjusting of the sensor values, so that, in addition, and without interrupting the process, a reliable online prognosis of the quality features may take place.

If a sensor fault is detected that cannot be corrected online, the output of a corresponding message 32 takes place, in case the component part has been ascertained as being scrap. If no sensor fault is discovered in decision criterion 30, the values, among other things, are further passed on to a process stability module 34. By sensor monitoring module 28 it is ensured thereby that only significant sensor values are used for additional evaluation. The long term development of the injection molding process is able to be valued in process stability module 34. For this, there takes place a valuation of the development of the process characteristic variables and also of the sensor data. If the process does not develop within specified tolerance values, a corresponding message is output. The process characteristic variables of process characteristic variables module 24 are transmitted to a quality prognosis module 36 which, from process-conditioned changes of the process characteristic variables, carries out online a quality prognosis for at least one, which may be for each quality feature of an injection molded component part. Scrap gate 22 is actuated by quality prognosis module 36.

Injection molding component parts, whose prognosticated quality features lie outside the respective tolerance ranges are thus removed. According to the exemplary embodiments and/or exemplary methods of the present invention, an online component part control 20 of one or more quality features of the component part to be fabricated is possible. The data of the quality features measured in this manner are, in this case, also transmitted to quality prognosis module 36. The results of quality prognosis module 36 represent essential input values for process setting module 38, which, when appropriately required, ascertains a new working point 40 together with associated process setting variables 14 of injection molding machine 10.

Figure 3:
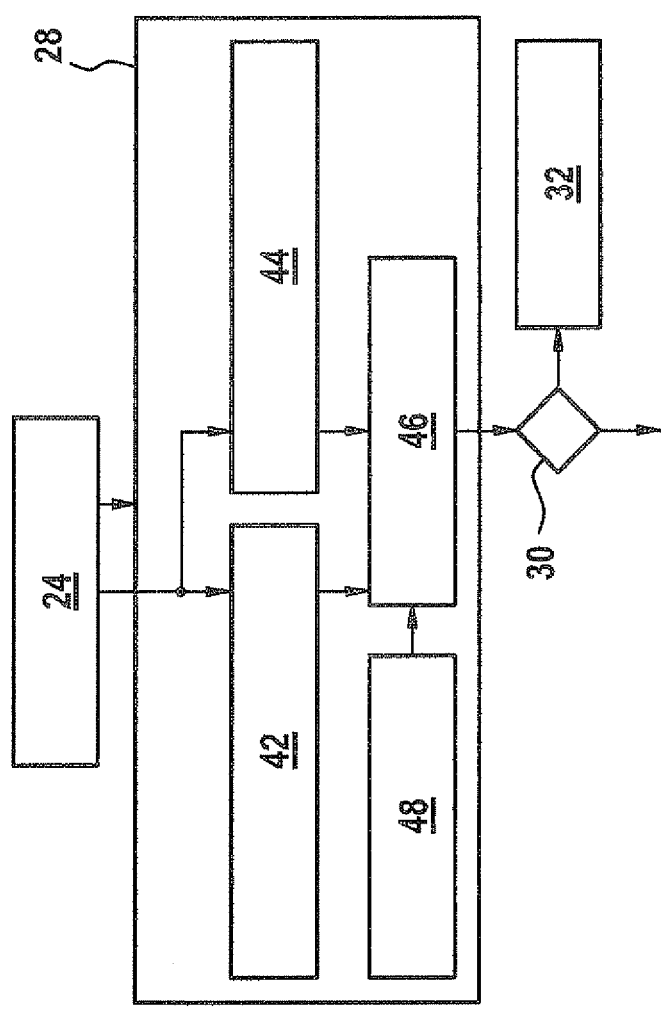
FIG. 3 shows a block diagram of a sensor monitoring module.

FIG. 3 shows a block diagram of a sensor monitoring module 28. Process characteristic variables 24 go into sensor monitoring module 28 as input data, which are gathered from the data of internal process sensor system 12 and external sensor system 18. In this context, changes show up of perhaps a certain sensor value with the aid of one or more process characteristic numbers, which are gathered from the associated sensor signals. The monitoring of internal sensor system 12 and of external sensor system 18 takes place, on the one hand, via checking process characteristic variable boundary values 42, that is, of the maximum values and the minimum values of the process characteristic variables, and on the other hand, by a comparison of the process characteristic variables values to the respective process characteristic variables reference values 44, which are gathered from the curves over time of the process characteristic variables of process characteristic variable module 24 from previous injection molding cycles in valuing model 46.

Figure 5:
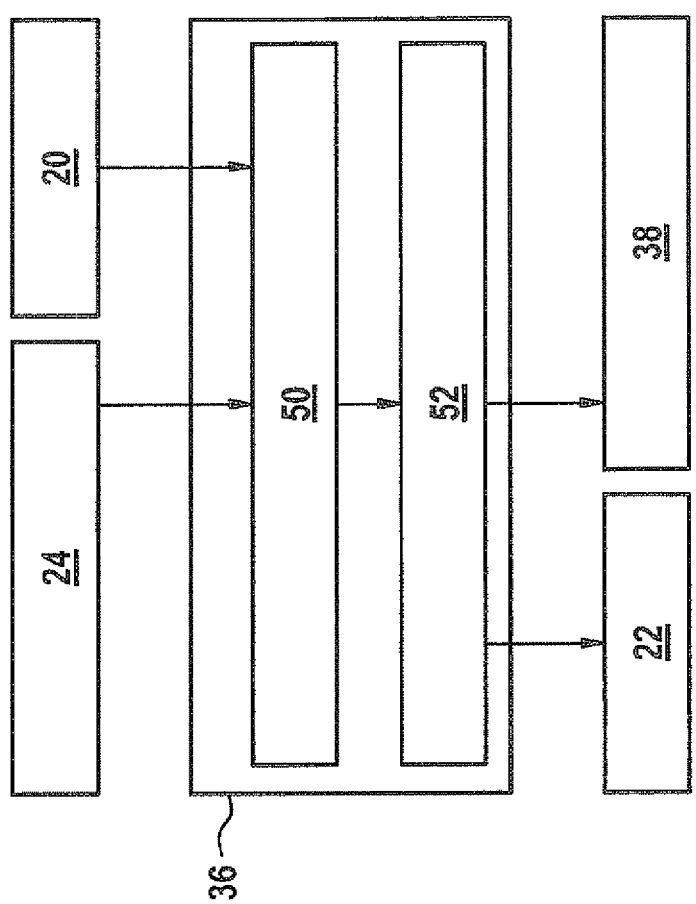
FIG. 5 shows a block diagram of a quality prognosis module.

According to the exemplary embodiments and/or exemplary methods of the present invention, the results of a sensitivity analysis 48 additionally go into the valuation. By sensitivity analysis 48 it is taken into account that individual process characteristic variables having very different weighting may go into a prognosis model of quality features 50, of quality prognosis module 36. Therefore, fluctuations in individual process characteristic variables act differently firmly on the prognosis of quality features 52, which are shown in FIG. 5. In the reverse case, the significance may be estimated therewith of the individual process characteristic variables. If this shows that one or more process characteristic variables, or their development, point to a faulty sensor system, the output of a corresponding message 32 by decision module 30 takes place.

Figure 4:
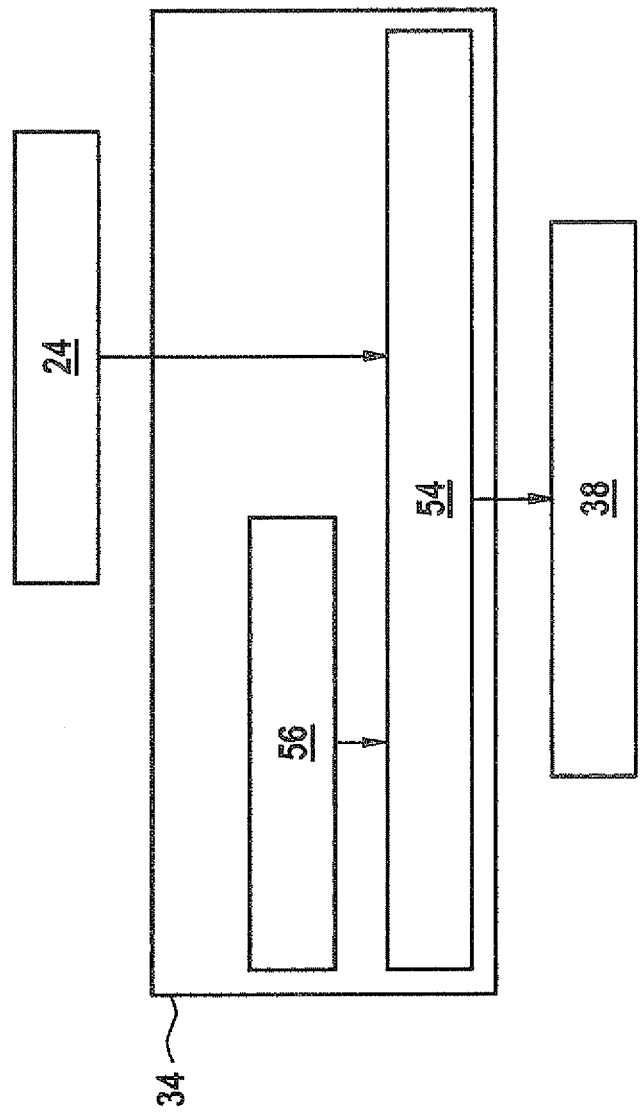
FIG. 4 shows a block diagram of a process stability module.

FIG. 4 shows a block diagram of a process stability module 34. If the sensor system is valued as in order by sensor monitoring module 28, the monitoring of process stability takes place in process stability module 34. For this, there takes place a valuation of process stability 54, using process characteristic variables 24 and their curve over time 56 as input variables. Only when the injection molding process is valued as being sufficiently stable is fabrication able to take place under reproducible fabricating conditions, and the requirement of a new working point in process setting module 38 is able to be detected in a reliable manner.

A block diagram of quality prognosis module 36 is shown in FIG. 5. Input variables into quality features prognosis module 50 are process characteristic variables 24 as well as, if present, measured data of online component parts control 20. Based on prognosis module 50, a prognosis of quality features 52 takes place for all injection molded component parts fabricated during the injection molding process. In case not all prognosticated quality features of a fabricated injection molded component part is valued as being in order, scrap gate 22 is actuated and the corresponding faulty injection molded component part is removed. The data of the prognosticated quality features 52 go into central process setting module 38, for additional process valuation.

Figure 6:
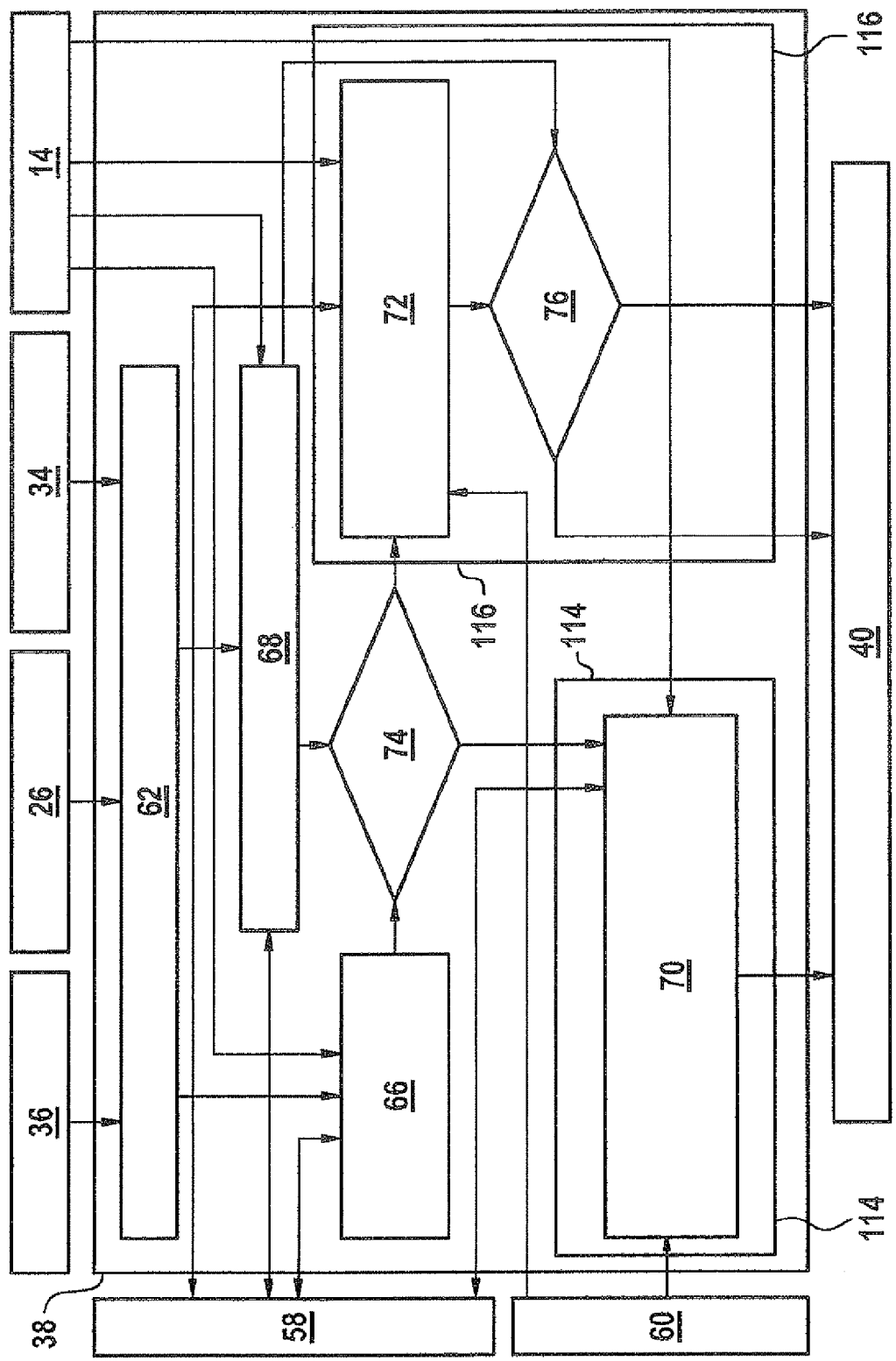
FIG. 6 shows a block diagram of a process setting module.

FIG. 6 shows a block diagram of process setting module 38. In process setting module 38, the working point of the injection molding process is ascertained based on quality prognosis module 36, process drift detection 26 and process stability 34, is evaluated and, if necessary, a new working point 40 is established. In addition, process setting variables 14 as well as the results from a working point module 58 and the input of the hierarchical follow-up control 60 go into process setting module 38. In module regulating criterion 62 it is established whether no change in working point 64 is required, see FIG. 7, or whether a new working point 40 is to be ascertained.

If a new working point 40 is required, based on the development of the injection molding process, it is the aim of the invention to undertake the changes of process setting variables 14 step-wise in the direction towards the best possible, that is, global working point in such a way that, at all time steps from beginning to reaching the new global working point, if possible, no component parts are fabricated which are not in order, i.e. whose quality features lie outside the specified tolerance values. Thereby, a clear increase is achieved in the energy efficiency of the injection molding process and, at the same time, the material efficiency is raised optimally by the avoidance of scrap parts. In order to achieve this aim according to the present invention, depending on the fabricating process, individual process setting variables 14, such as process setting variable PS1 has to be followed up slowly from a value $PS1_{old}$ in the direction towards the value $PS1_{new}$. This means that, during the transition time from a global working point $GOA_{old}$ to a new global working point $GOA_{new}$ the injection molding process takes place using a constantly changing working point, but in such a way that all the quality features of the further component parts fabricated lie within the tolerance specifications.

According to the exemplary embodiments and/or exemplary methods of the present invention, this is achieved in that, using working point module 58, the determination of a global working point 66, of a local working point without a hierarchical follow-up rule 68 LOA1, of a local working point having a hierarchical follow-up rule 70 LOA3 as well as of a local working point having a static hierarchical follow-up rule 72 LOA2 takes place and the individual working points are valued and used corresponding to the specification of the aim "zero faulty fabrication". The time scales at which the injection molding process reacts to changes of individual process setting variables may be very different. Thus, for example, during injection molding, a pressure change may take place very rapidly, that is, almost without time delay, from one component part to the next component part while the temperature changes during the injection molding process may be undertaken only very slowly and require a follow-up rule.

Thus there comes about a hierarchy in the time scales of the process setting variables. The input of the hierarchical follow-up rule takes place via module 60. Follow-up rule 60 dynamically determines, together with working point module 58, the local working points LOA3 to be followed up step-wise, which is determined by a module 114 having global regulating strategy using hierarchical process follow-up. The new working points, that is, the new values to be set of the process setting variables in the transition region of global working point $GOA_{old}$ to new global working point $GOA_{new}$ of the injection molding process are ascertained based on a comparing decision criterion 74 "GOA significantly better than LOA1?" and a comparing decision criterion 76 "LOA2 significantly worse than LOA1?" and passed on to the injection molding machine.

In this context, in decision criterion 74 it is evaluated whether global working point GOA is significantly better than the local working point without hierarchical follow-up rule LOA1. If the answer is yes, the determination of the local working point takes place with dynamic hierarchical follow-up rule LOA3 70 via global regulating strategy 114. If the answer is no, the determination of the local working point takes place with static hierarchical follow-up rule LOA2 72 via local regulating strategy 116. In decision criterion 76 it is evaluated whether the local working point having static hierarchical follow-up rule LOA2 is significantly worse than the local working point without hierarchical follow-up rule LOA1, that is, whether a global regulating strategy having hierarchical process follow-up or a local regulating strategy respectively is used, for both possibilities a new working point 40 being determined.

Figure 7:
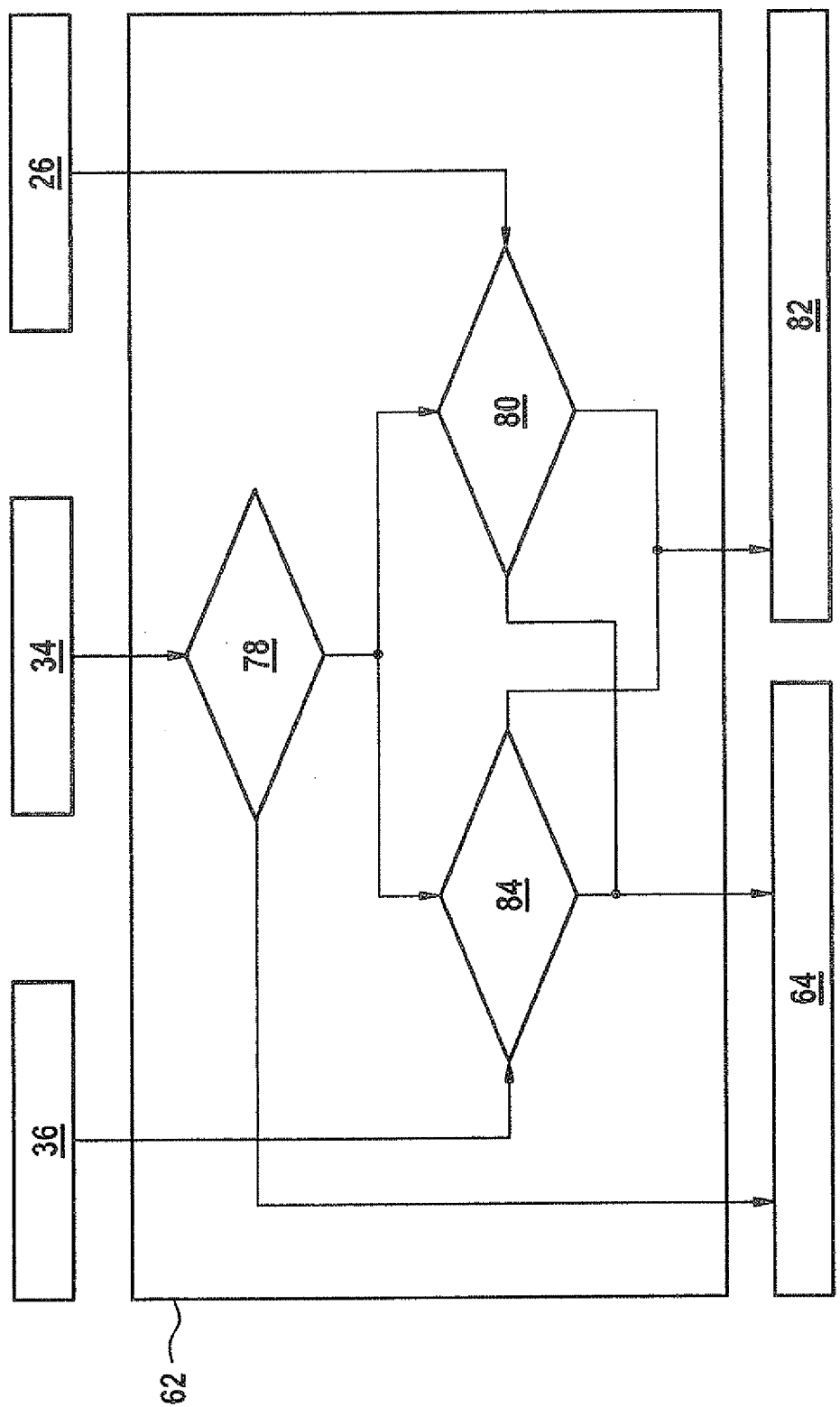
FIG. 7 shows a block diagram of a regulating criterion module.

A block diagram of a regulating criterion module 62 is shown in FIG. 7. No change takes place in working point 64, as long as the injection molding process is not stable, which is what is determined in decision criterion 78. This is ascertained in decision criterion 78 using the data of process stability module 34. If one may assume a stable injection molding process, it is ascertained in decision criterion 80 whether a process drift has been detected. If yes, a signal is emitted for ascertaining of new working point 82 GOA, LOA1, LOA2, LOA3. If no, the working point is not changed 64. Similarly, a new working point is requested in field 82, if, during a specified fabricating time the quality features of the fabricated component parts lie outside the tolerance specifications, which is ascertained in decision criterion 84.

Figure 8:
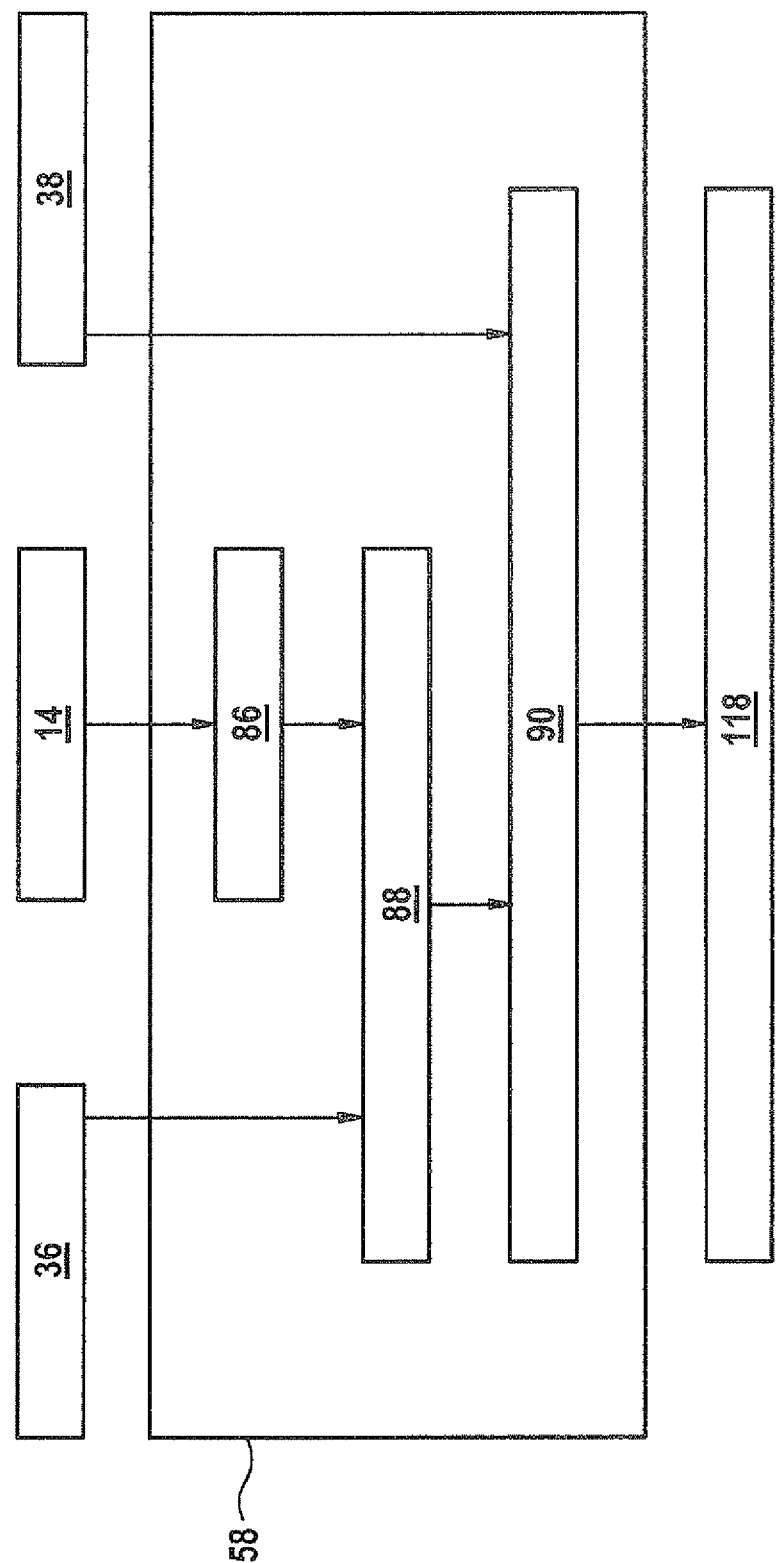
FIG. 8 shows a block diagram of a working point module.

FIG. 8 shows a block diagram of working point module 58. Inside working point module 58, local working points LOA1, LOA2, LOA3 and global working point GOA are ascertained 118. As input data, process setting variables 14, data for process setting from process setting module 38 and data of the quality prognosis from quality prognosis module 36 are used. In a process models module 86 a connection is produced between the process setting variables and the quality features. On the one hand, quality prognosis module 36 yields a connection between the quality features and the process characteristic variables gathered via the sensor system online, as well as the characteristic variables from online component parts control 20, and on the other hand, there is a connection between process setting variables 14 and the quality features.

As long as the process setting remains unchanged, one would expect, without additional interfering influences and process changes, that the quality features of the fabricated component parts also remain unchanged. External interferences, process changes as a result of internal processes during fabrication do however act upon the values of individual process characteristic variables and/or values that are recorded in online component parts control 20, and are thus able to be evaluated via quality prognosis module 36. Differences in the quality prognoses of the quality features via quality prognosis module 36 are recorded, evaluated, and, according to the exemplary embodiments and/or exemplary methods of the present invention, lead to a correction of the process models of process model module 86 in the module corrected process models 88. The corrected process models form the starting point for ascertaining the working points in the module ascertaining optimal working points 90. Output values of working point module 58 are thus local working points LOA1, LOA2, LOA3 and global working point GOA are.

Figure 9:
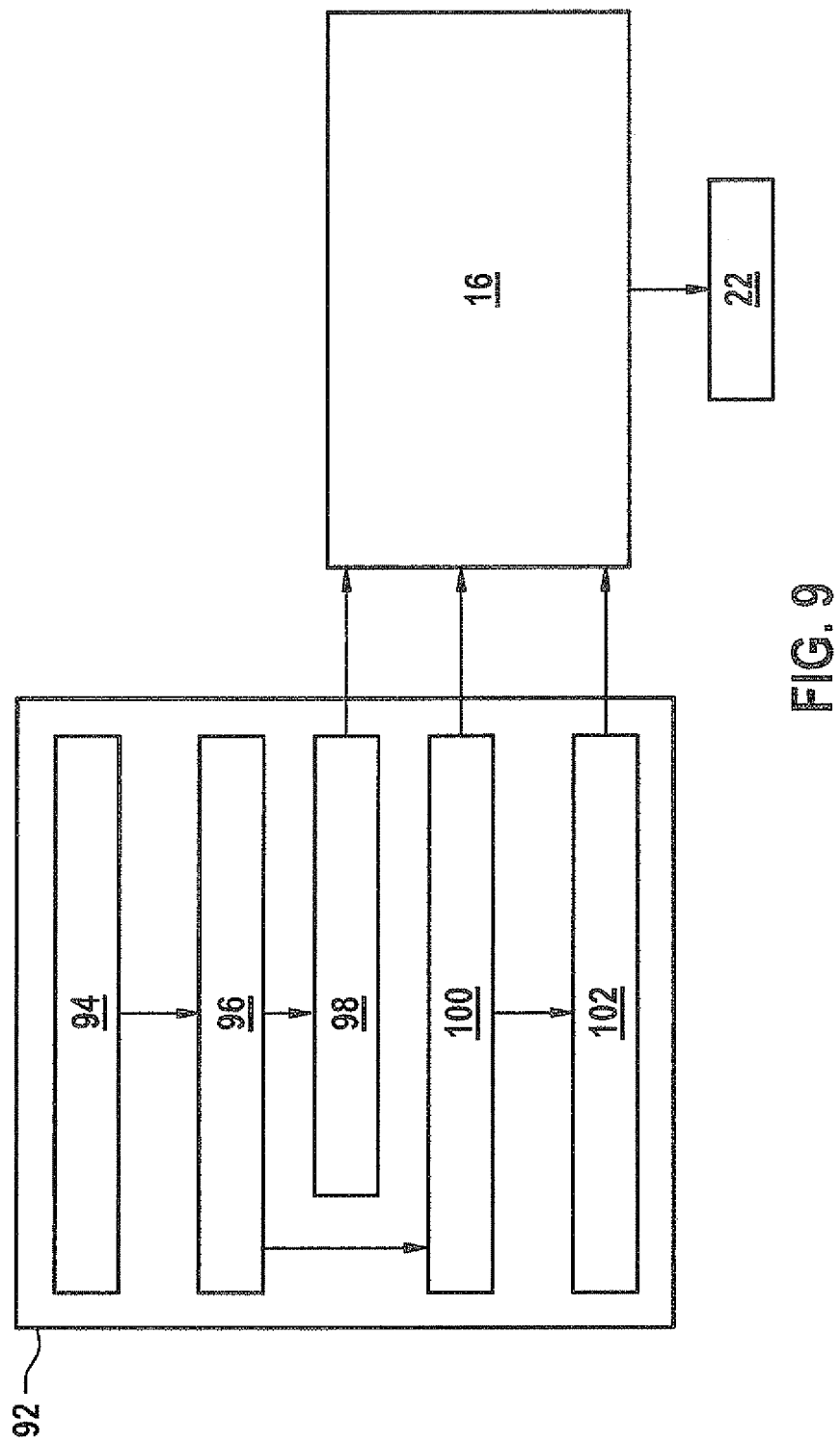
FIG. 9 shows a block diagram of an installation phase module.

FIG. 9 shows a block diagram of an installation phase module 92. A trial plan 94 according to the known principles of Design of Experiment (DoE) is set up as a function of the number and the value range of the process setting variables. A module 96 is provided for the automated DoE execution 96, in accordance with the exemplary embodiments and/or exemplary methods of the present invention. The results of this automated DoE execution 96 are given over to a module 98, for generating the process models. Process models 98 produced are passed on to regulating module 16. Similarly, the results of automated DoE execution 96 are passed on to a module determination of process characteristic variables 100. These obtained process characteristic variables 100 are also processed further in regulating modules 16, the same as the quality prognosis models generated in module 102.

FIG. 10 shows a block diagram of the module automated DoE execution 96. After setting up the trial plan that is to be executed in module trial plan DoE 94, first of all, the process setting variables are passed on via a trial N+1 122 and averaged process setting variables 124 for a first process setting N+1 104 to the injection molding machine, and injection molding process 126 is started. Via process-internal sensor system 12, the calibration of the process stability is monitored in the module calibration process stability 106. In decision criterion 128 it is ascertained whether the calibration of module 106 is complete. If yes, the process stability is monitored in the module monitoring process stability 108. If not, the calibration in module 106 is continued. In decision criterion 110, it is ascertained whether the process is sufficiently stable. If process stability is a given, then, for measuring the fabricated injection molded component parts, a sampling 120 takes place for a specified number of parts, otherwise a waiting time is specified up to the admissible sampling of component parts to be measured via a waiting time module 112, that is, the process stability is monitored further in module 108 until it is ascertained in decision criterion 110 that the process is stable and sampling 108 may be undertaken.

If the provided number of component parts for a first trial setting according to the DoE is finished, the next trial setting is started, and the associated process setting variables are given over to the injection molding machine. If the injection molding process again reaches a stable state according to module 108, a new sampling takes place, after the end of which the next trial setting of the trial plan takes place again. This procedure is continued until all the trials of the trial plan have been executed. As the last control, the first trial setting may be started once more, so that inadmissible changes during the automated DoE execution may still be detected, if necessary, and be able to be corrected by a trial repetition.

What is claimed is:

1. A method for regulating an injection molding process, in which process setting variables of an injection molding machine are controlled via a regulating module, the method comprising:
    receiving, at the regulating module, at least one of: (i) data from a process-internal sensor system of the injection molding machine, (ii) data on the fabricating sequence of the injection molding parts from an external sensor system, and (iii) data on a quality of a fabricated injection molded component part from an online component part control;
    evaluating the received data in a quality prognosis module; and
    performing, as a function of the evaluation of the data, a change in the process setting variables of the injection molding machine;
    wherein responsive to the change in the process setting variables, the injection moding machine is changed from a first working point of the injection molding machine to a new working point, so that the quality features of the injection molded component parts fabricated using the new working point lie within the specified tolerances of the quality of the injection molded component parts, wherein the first working point and the new working point each include setting parameters for the process setting variables of the injection molding machine; and wherein the injection molding machine is changed from the first working point to the new working point by:
  determining the new working point, and
  after the determining, changing the process setting variables in a step-wise fashion from the first working point towards the new working point so that the quality of features of an injection molded component formed at each step using the step-wise changed process setting parameters lie within the specified tolerances of the quality of the injection molded component parts.

2. The method of claim 1, wherein process characteristic variables are ascertained within the regulating module from the data of the external sensor system and from the data of the internal-process sensor system, and a quality prognosis is carried out for at least one quality feature of an injection-molded component part from the ascertained process characteristic variables and the data of the online component part control.

3. The method of claim 2, wherein a process stability is ascertained inside the regulating module using the ascertained process characteristic variables and, if the ascertained process stability exceeds specified boundary values, a message is output.

4. The method of claim 1, wherein the regulating module detects sensor faults occurring during the injection molding process and corrects the detected sensor faults online.

5. The method of claim 1, wherein a scrap gate is actuated via the quality prognosis module.

6. The method of claim 1, wherein the regulating module includes a process setting module, the process setting module evaluating the working point of the injection molding process based on a quality prognosis from the quality prognosis module, a process drift detection, and a process stability, and if necessary based on the evaluation, the process setting module changes the working point to a new working point.

7. The method of claim 6, wherein the quality prognosis module generates quality features and provides the generated quality features to the process setting module, which applies the generated quality features to a determination by which the new working point is selected.

8. The method of claim 6, wherein the working point is changed to the new working point by the process setting module according to the following:
  determining, based on data for the process stability from a process stability module, if the injection molding process is stable,
  detecting, based on data for the process drift detection from a process drift detection module, if process drift exists,
  determining, based on the quality prognosis from the quality prognosis module, if the quality features of the fabricated component parts lie outside or inside the specified tolerances,
  when (i) the injection molding process is determined to be stable and the process drift is detected or (ii) the injection molding process is determined to be unstable and the quality features are determined to be outside the specified tolerances, then the new working point is deemed necessary, and
  when (i) the injection molding process is determined to be unstable and the quality features are determined to be inside the specified tolerances or (ii) the injection molding process is determined to be stable and the process drift is not detected, then the new working point is deemed unnecessary.

9. The method of claim 8, wherein the change in the process setting variables is performed to switch at least one process setting variable to at least one new process setting variable such that the new working point is constantly changing.

10. The method of claim 1, wherein the step-wise change in the process setting variables of the injection molding machine is performed in a hierarchical sequence.

11. The method of claim 10, wherein the hierarchical sequence changes process setting variables that are time-critical to a reaction time of the injection molding machine to a different extent compared to process setting variables that are not time-critical to the reaction time.

12. The method of claim 1, wherein the evaluating performed in the quality prognosis module is carried out for at least one quality feature of an injection molded component part.

13. The method of claim 12, wherein the evaluating performed in the quality prognosis module is carried out for each quality feature of the injection molded component part, wherein the injection molded component part has at least two quality features.

14. The method of claim 1, wherein:
  the quality prognosis module is included in the regulating module, and the quality prognosis module receives:
    (i) process characteristic variables based on the data from the external sensor system and the data from the process-internal sensor system, and
    (ii) the data from the online component part control, and
  the quality prognosis module generates prognosticated quality features that the quality prognosis module provides to a process setting module included in the regulating module.

15. The method of claim 1, wherein the changing of the process setting variables in the step-wise fashion includes forming at least one injection molded component at each step of the step-wise change.

16. The method of claim 1, wherein the changing of the process setting variables in the step-wise fashion includes:
  determining a plurality of local working points, the local working points representing changes to the process setting variables to be followed step-wise during the change from the first working point to the new working point; and
  changing the process setting variables using the local working points.

17. A regulating module for regulating an injection molding process, in which process setting variables of an injection molding machine are controlled, comprising:
  a receiving arrangement to receive at least one of: (i) data from a process-internal sensor system of the injection molding machine, (ii) data on the fabricating sequence of the injection molding parts from an external sensor system, and (iii) data on a quality of a fabricated injection molded component part from an online component part control; and
  a quality prognosis module to evaluate the received data, performing, as a function of the evaluation of the data, a change in the process setting variables of the injection molding machine; wherein responsive to the change in the process setting variables, the injection molding machine is changed from a first working point to a new working point, so that the quality features of the injection molded component parts fabricated using the changed working point lie within the specified tolerances of the quality of the injection molded component parts, wherein the first working point and the new working point each includes setting parameters for the process setting variables of the injection molding machine; and wherein the injection molding machine is changed from the first working point to the new working point by a module which:

determines the new working point, and after the new working point is determined, changes the process setting variables in a step-wise fashion from the first working point towards the new working point so that the quality of features of the injection molded components formed at each step using the step-wise changed process setting parameters lie within the specified tolerances of the quality of the injection molded component parts.

18. The regulating module of claim 17, wherein the quality prognosis module rejects component parts when the component parts have prognosticated quality features that are outside the specified tolerances associated with the component parts.

\* \* \* \* \*